United States Patent
Stellaccio et al.

(10) Patent No.: US 6,773,630 B2
(45) Date of Patent: Aug. 10, 2004

(54) PROCESS FOR THE GASIFICATION OF HEAVY OIL

(75) Inventors: Robert J. Stellaccio, Spring, TX (US); Donald D. Brooker, Hopewell Junction, NY (US); Henry C. Chan, Bellaire, TX (US)

(73) Assignee: Texaco Inc., San Ramon, CA (US)

( * ) Notice: Subject to any disclaimer, the term of this patent is extended or adjusted under 35 U.S.C. 154(b) by 441 days.

(21) Appl. No.: 10/002,510

(22) Filed: Nov. 2, 2001

(65) Prior Publication Data

US 2003/0085385 A1 May 8, 2003

(51) Int. Cl.[7] .............................. C01B 3/24; C01B 3/26
(52) U.S. Cl. .................. 252/373; 48/197 R; 48/211; 48/212
(58) Field of Search ................ 252/373; 48/197 R, 48/211, 212

(56) References Cited

U.S. PATENT DOCUMENTS

| | | | |
|---|---|---|---|
| 3,544,291 A | 12/1970 | Schlinger et al. | 48/206 |
| 4,113,445 A | 9/1978 | Gettert et al. | 48/197 |
| 4,328,006 A | 5/1982 | Muenger et al. | 48/62 |
| 4,386,941 A | 6/1983 | Crouch et al. | 48/197 |
| 4,443,228 A | 4/1984 | Schlinger | 48/86 |
| 4,525,175 A | 6/1985 | Stellaccio | 48/86 |
| 4,959,080 A | 9/1990 | Sternling | 48/210 |
| 5,281,243 A | 1/1994 | Leininger | 44/629 |
| 5,441,548 A * | 8/1995 | Brandl et al. | 252/373 |

* cited by examiner

*Primary Examiner*—Wayne A. Langel
(74) *Attorney, Agent, or Firm*—Josetta I. Jones; Howrey, Simon, Arnold & White, LLP

(57) ABSTRACT

The present invention provides a process whereby a high viscosity hydrocarbonaceous material is fed to a gasifier for conversion to synthesis gas. The feedstock, steam, oxygen, and recycled gasification system water are all fed into the gasifier through a four stream feed injector. The feedstock in this design is sandwiched between two oxygen streams so as to provide better conversion for the exceptionally heavy feed. The fourth stream down the central bayonet of the feed injector provides the flow path for the recycled water.

15 Claims, 1 Drawing Sheet

PROCESS FOR THE GASIFICATION OF HEAVY OIL

BACKGROUND OF THE INVENTION

The process and advantages of gasifying hydrocarbonaceous material into synthesis gas are generally known in the industry. In high temperature gasification processes, synthesis gas is commonly produced from gaseous combustible fuels, such as natural gas, liquid combustible fuels, and solid combustible organic fuels, such as coal, residual petroleum, wood, tar sand, shale oil, and municipal, agriculture or industrial waste. The gaseous, liquid or solid combustible organic fuels are reacted with an oxygen-containing gas, such as air, enriched air, or nearly pure oxygen, and a temperature modifier, such as steam, in a gasifier to obtain the synthesis gas.

In the reaction zone of the gasifier, the contents will commonly reach temperatures in the range of about 1,700° F. (930° C.) to about 3,000° F. (1650° C.), and more typically in the range of about 2,000° F. (1100° C.) to about 2,800° F. (1540° C.). Pressure will typically be in the range of about 1 atmosphere (100 KPa) to about 250 atmospheres (25,000 KPa), and more typically in the range of about 15 atmospheres (1500 Kpa) to about 150 atmospheres (1500 KPa).

In a typical gasification process, the synthesis gas will substantially comprise hydrogen ($H_2$), carbon monoxide (CO), and lessor quantities of impurities, such as water ($H_2O$), carbon dioxide ($CO_2$), carbonyl sulfide (COS), hydrogen sulfide ($H_2S$), nitrogen (N2) and argon (Ar). A quench drum located below the reaction zone of the gasifier is used to cool the synthesis gas and remove any solids, particularly ash and/or slag and the particulate carbon soot leaving the reaction zone of the gasifier. In the quench drum, the synthesis gas is passed through a pool of water and exits the quench drum through an outlet nozzle above the water level. The solid particulates settle in the bottom of the drum and are removed. Meanwhile, quench water is continuously removed and added to the quench drum so as to maintain a steady liquid level in the drum.

The synthesis gas is commonly treated to remove or significantly reduce the quantity of impurities, particularly $H_2S$, COS, and $CO_2$ before being used in a downstream process. The synthesis gas is produced for a variety of useful processes, such as producing hydrogen for refinement, carbon monoxide for chemicals production, or producing fuel gas for combustion turbines to produce electricity.

Generally, the heavier the feed, the higher the carbon to hydrogen ratio. A high C/H ratio means that the temperature in the reaction zone of the gasifier will be hotter than when feeds of a lower C/H ratio are gasified. Thus, the use of a temperature moderator, usually steam, water or an inert gas such as carbon dioxide, is required to moderate the temperature in the reaction zone of the gasifier. Water commonly serves as both the carrier and the temperature moderator for solid fuels. Water is also commonly mixed with liquid hydrocarbon fuels. Steam may also be introduced into the gasifier in admixture with either the feed, the free-oxygen containing gas stream, or both.

Generally, a portion of the quench water removed from the quench drum of a gasifier is processed in a downstream unit and recycled back to be mixed with the feed to the gasifier. In most cases, the mixing of the quench water and the feed does not cause any problems. When liquid feedstocks are so heavy that they need to remain heated so as to keep their viscosities down to pumpable levels, however, the mixing of the quench water with the feedstocks is no longer practical.

Viscosity also plays an important part in the conversion of the feedstock in the gasifier. Generally, it is desirable to atomize the feed in order to spray fine particles into the reactor. The finer the particles, the higher the conversion will be. It is difficult, though, to atomize materials with high viscosities into fine particles, and the addition of water can produce non-homogeneous mixtures. Thus, mixing water with a high viscosity feedstock can also adversely affect conversion in the gasifier if mixing is poor.

SUMMARY OF THE INVENTION

The present invention provides a process whereby a liquid hydrocarbonaceous material of high viscosity is fed to a gasifier for conversion to synthesis gas. The feedstock, steam, oxygen containing gas, and recycled quench water are all fed into the gasifier through a four stream feed injector. The feedstock in this design is sandwiched between two oxygen streams so as to provide better atomization of the exceptionally heavy feed and, hence, better conversion to synthesis gas. The central bayonet of the feed injector provides a flow path for the fourth stream, the quench water recycle. This arrangement avoids mixing and cooling the feedstock that would increase the viscosity and thereby lower conversion in the gasifier.

DESCRIPTION OF ILLUSTRATIVE EMBODIMENTS

Figure 1:
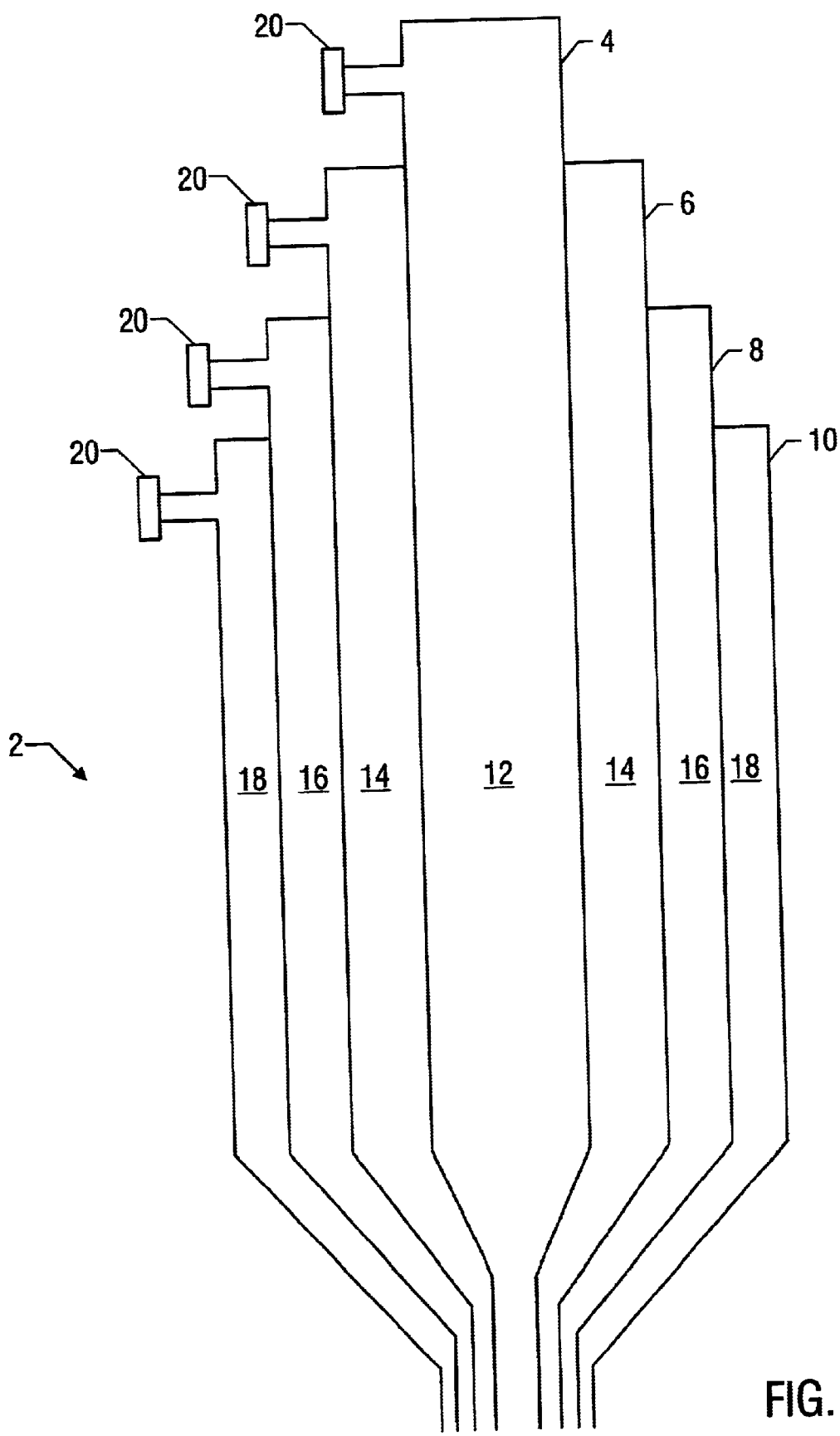
FIG. 1 provides an overview of a four-stream feed injector for use in a gasifier.

The present invention pertains to a novel process for the partial oxidation, or gasification, of a high viscosity liquid hydrocarbon feedstock. By definition, gasifier, partial oxidation reactor, or gasifier are used interchangeably to describe the reactor in which the partial oxidation of a feedstock takes place, converting the feedstock into synthesis gas. Partial oxidation reactors are well known in the art, as are the partial oxidation reaction conditions. See, for example, U.S. Pat. Nos. 4,328,006, 4,959,080 and 5,281,243, all incorporated herein by reference. The feedstock of a gasifier is reacted with an oxygen-containing gas, such as air, enriched air, or nearly pure oxygen, and a temperature modifier, such as water or steam, in a gasifier to produce the synthesis gas. The oxygen is used to partially oxidize the carbon in the feedstock into primarily carbon monoxide and hydrogen gas. The temperature modifier is used to control the temperature inside the gasifier. Together, the oxygen and the temperature modifier can impact the composition of the synthesis gas, but the control of the gasifier is outside the scope of the present invention.

Partial oxidation reactions use a limited amount of oxygen with hydrocarbon feedstocks to produce hydrogen and carbon monoxide (i.e. synthesis gas or syngas), instead of water and carbon dioxide as occurs in the case of complete oxidation. This reaction is shown in equation (1) for a straight chain hydrocarbon:

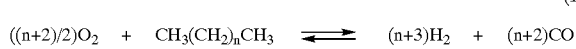
(1)

In actuality, this reaction is difficult to carry out as written. There will always be some production of water and carbon dioxide via the water gas shift reaction (2):

(2)

This reaction is reversible, i.e., the extent to which it proceeds depends upon the conditions of temperature and pressure. High temperature and low pressure favor the production of synthesis gas.

The partial oxidation reaction is conducted under reaction conditions that are sufficient to convert a desired amount of carbon-containing feedstock to synthesis gas or syngas. Reaction temperatures typically range from about 1,700° F. (930° C.) to about 3,000° F. (1650° C.), and more typically in the range of about 2,000° F. (1100° C.) to about 2,800° F. (1540° C.). Pressures typically range from about 1 atmosphere (100 KPa) to about 250 atmospheres (25,000 KPa), and more typically in the range of about 15 atmospheres (1500 Kpa) to about 150 atmospheres (1500 KPa).

The syngas product composition will vary depending upon the composition of the feedstock and the reaction conditions. Syngas generally includes CO, $H_2$, steam, $CO_2$, $H_2S$, COS, $CH_4$, $NH_3$, $N_2$, some Ar, and, if present in the feed to the partial oxidation reactor at high enough concentrations, less readily oxidizable volatile metals, such as those typically found in heavy oil fields, such as iron, nickel and vandium.

Ash-containing feedstocks, such as the ones used in the present invention, frequently produce non-gaseous byproducts that include coarse slag and other materials, such as char, fine carbon particles, and inorganic ash. The coarse slag and inorganic ash are frequently composed of metals such as iron, nickel, sodium, vanadium, potassium, aluminum, calcium, silicon, and the oxides and sulfides of these metals.

The coarse slag produced in partial oxidation reactors is commonly removed from the syngas in molten form from the quench section of a gasifier. In the quench section of the gasifier, the synthesis gas product of the gasification reaction is cooled by being passed through a pool of quench water in a quench chamber immediately below the gasifier. Slag is cooled and collects in this quench chamber, from which it and other particulate materials that accumulate in the quench chamber can be discharged from the gasification process by use of a lockhopper or other suitable means. The syngas exiting the quench chamber is passed through an aqueous scrubber for additional removal of particulates before further processing. Quench water is continuously removed and added to the quench chamber so as to maintain a constant level of quench water in the quench chamber of the gasifier.

In the present invention, a four-stream feed injector for a gasifier, such as that found in U.S. Pat. No. 4,525,175, is used to process a high viscosity liquid feedstock. Referring now to FIG. 1, an illustration of a four stream feed injector tip is provided. The feed injector 2 includes a central cylindrical conduit 4 and second 6, third 8, and outer 10 cylindrical conduits radially spaced from each other. This setup provides a center passage 12, and a first 14, a second 16, and an outer 18 annular coaxial concentric annular passage. The conduits are coaxial with the central longitudinal axis of the feed injector. All of the conduits and annular passages are closed at the upstream ends and open at the downstream ends. The upstream ends of each conduit have a flanged inlet nozzle 20 for the introduction of material. The inside and outside diameters of the central conduit are reduced near the downstream end of the feed injector to form a conical shaped nozzle. This is generally representative of a four-stream feed injector that can be employed for use in the present invention. It is within the scope of this invention to use any four-stream feed injector for use in the partial oxidation of a high viscosity feedstock.

The feed injector assembly is inserted downward through a top inlet port of a gasifier, for example as shown in U.S. Pat. No. 3,544,291. The feed injector extends along the central longitudinal axis of the gasifier with the downstream end discharging directly into the reaction zone. The relative proportions of the reactant feedstreams introduced into the gasifier are carfully regulated to convert a substantial portion of the carbon in the fuel e.g., up to about 90% or more by weight, to carbon oxides; and to maintain an autogenous reaction zone temperature in the range of 1,700° F. (930° C.) to about 3,000° F. (1650° C.), and more typically in the range of about 2,000° F. (1100° C.) to about 2,800° F. (1540° C.).

The reactants that are to be introduced into the four-stream feed injector assembly are a oxygen-containing gas, such as air, enriched air, or nearly pure oxygen, a temperature modifier, such as steam and/or water, preferably recycled water from the gasification system, and the high viscosity liquid hydrocarbon feedstock. The oxygen-containing gas, optionally admixed with steam or boiler feed water, is directed into the second 6 and outer 10 conduits of the feed injector, i.e. the first 14 and outer 18 annular coaxial concentric annular passages. The high viscosity liquid hydrocarbon feedstock is to be introduced into the feed injector through the third conduit 8 of the feed injector, i.e. the second 16 annular coaxial concentric annular passage. A water temperature modifier, preferably recycled gasification system water containing carbon soot from the gasifier, is fed through the center cylindrical conduit 4 of the feed injector into the center passage 12 of the injector.

By definition, a high viscosity liquid hydrocarbon is any one of a number of heavy oils known in the industry. The group of known heavy oils consists, among others, of virgin crude, residua from petroleum distillation and cracking, petroleum distillate, reduced crude, whole crude, asphalt, coal tar, coal derived oil, shale oil, tar sand oil, solvent deasphalting bottoms, and mixtures thereof. Generally, these heavy oils have high sulfur and nitrogen component concentrations, and they usually contain a high concentration of nickel, iron, and vanadium-containing ash. Some feeds may also contain catalyst fines consisting of silicon and alumina materials. The feedstocks of the present invention are sometimes referred to as "bottom of the barrel" hydrocarbons, named so because of their propensity to be the thickest, heaviest components of refined crude oil.

The ash in the feed consists of nickel, iron, and vanadium, as well as catalyst fines (such as those from a fluid catalytic cracking unit (FCCU), from previous processing operations). The combination of these components produces an ash that will eventually plug the gasifier with a coarse, viscous slag that does not readily flow out of the gasifier into the quench drum during normal operation.

Commonly, the ash-containing feedstocks used in the present invention are mixed with a fluxing agent prior to introduction into the gasifier. The fluxing agent is required to promote fluidity of the ash in the feed during gasification. It provides additional components that alter the slag fluid behavior so that the slag flows out of the gasifier during normal operation. The fluxing agent is usually prepared from a blend of calcium oxide and FCCU catalyst fines, and it is introduced into the feedstock as a liquid slurry with a carrying agent (preferably one that can also act as a cutter stock and further reduce the viscosity of the feedstock, cush as FCC decant oil).

All the feedstocks of the present invention share in common a high viscosity that requires heating to keep the feedstock at a suitable viscosity for pumping. For example, a normal, low viscosity vacuum resid feed to a gasifier is commonly heated to 480° F. prior to introduction to the feed injector. The viscosity of this feed at this temperature is preferably 20 centipoise or less, well below the limit for adequate pumping. The high viscosity feedstock of the present invention generally has a viscosity of 600 centipoise or greater at the normal feed temperature of about 480° F. (249° C.). The high viscosity feedstock would need to be heated using an auxiliary heat transfer medium, such as DOWTHERM™, to a temperature range of about 550–600° F. (288–316° C.) in order to keep its viscosity down to adequately pump the feedstock and to atomize the feedstock in the feed injector. The velocity of the stream of the high viscosity liquid hydrocarbon feedstock passing through the third conduit of the feed injector (the second annular passage of the burner) is in the range of about 1.0–100 feed per second, preferably about 25–75 feet per second.

Because of the high viscosity feedstock that the present invention is designed to handle, the water modifier cannot be mixed with the feedstock prior to its introduction into the gasifier. Inclusion of the water modifier with the high viscosity feedstock would decrease the temperature of the feedstock, thus increasing the viscosity and hindering the processing of the high viscosity feedstock. The water is still injected into the gasifier, but is done separately from the feedstock so as to avoid cooling the feedstock. This is why the present invention proposes to feed the water moderator through the center conduit of the four-stream feed injector. The velocity of the water moderator through the center conduit of the four-stream feed injector is in the range of about 10–120 feet per second, preferably 20–60 feet per second.

The oxygen-containing gas, optionally admixed with steam as an additional temperature modifier, is directed into the second and outer conduits of the burner, i.e. the first and outer annular coaxial concentric annular passages. The oxygen-containing gas is fed on either side of the high viscosity liquid hydrocarbon feedstock, which is introduced into the burner through the third conduit of the burner, i.e. the second annular coaxial concentric annular passages. This allows the oxygen-containing gas streams to provide shearing of the annular hydrocarbon feedstock stream to thereby provide some atomization of the feedstock stream. The velocity of the oxygen-containing gas streams (with or without admixture with steam as a temperature moderator) passing through the first and outer annular passages of the four-stream burner is in the range of about 50 feet per second to sonic velocity, preferably about 150–750 feet per second.

The use of a four-stream feed injector is imperative in the present invention. The configuration of sandwiching the hydrocarbon stream between the two oxygen streams provides better conversion with these heavy feeds by providing for increased atomization and better mixing of the feedstock with the oxygen containing gas. Sending water, preferably recycled soot containing water, down the central conduit of the feed injector allows the feedstock to stay hot and avoids mixing and cooling of the feedstock with water that could decrease viscosity and lower conversion.

In view of the above disclosure, one of ordinary skill in the art should appreciate that the present invention includes a continuous process for the the partial oxidation of a high viscosity hydrocarbon feedstream comprising passing a stream of water through the central conduit of a four-stream feed injector mounted in the upper portion of a gasifier, said feed injector comprising radially spaced concentric central, second, third, and outer cylindrical conduits, said conduits being open at their downstream exit orifice for discharge; simultaneously passing a high viscosity hydrocarbon feedstream through the third cylindrical conduit; simultaneously passing a stream of free-oxygen containing gas, optionally in admixture with a temperature moderator, through the second and outer cylindrical conduits; mixing the above mentioned streams together prior to, at, or downstream from the outer conduit exit orifices; and reacting the mixture in the reaction zone of the gasifier.

In a preferred embodiment, the water used is recycled gasification system water containing carbon soot from the gasifier traveling at a velocity of about 1.0–100 feet per second. The high viscosity hydrocarbon feedstock is selected from the group consisting of virgin crude, residua from petroleum distillation and cracking, petroleum distillate, reduced crude, whole crude, asphalt, coal tar, coal derived oil, shale oil, tar sand oil, solvent deasphalting bottoms, and mixtures thereof. High viscosity hydrocarbon feedstock generally has a viscosity of 600 centipoise or greater at a temperature of 480° F. (249° C.). It is fed to the feed injector at a temperature between about 550° F. (288° C.) and 600° F. (316° C.) and travels through the feed injector at a velocity of about 10 to 100 feet per second, preferably at about 25–75 feet per second. Free-oxygen containing gas is selected from the group consisting of air, enriched air, and nearly pure oxygen, optionally admixed with steam, water or an inert gas as the temperature moderator. The velocity of the oxygen containing gas passing through the first and outer annular passages of the feed injector is generally in the range of 50 feet per second to sonic velocity, preferably in the range of about 150–750 feet per second.

The reaction zone of the gasifier is usually at a temperature between about 1,700° F. (930° C.) and about 3,000° F. (1650° C.), preferably at a temperature between about 2,000° F. (1100° C.) and about 2,800° F. (1540° C.). The gasification pressure is usually between about 1 atmosphere (100 KPa) and about 250 atmospheres (25,000 KPa), preferably between about about 15 atmospheres (1500 Kpa) and about 150 atmospheres (1500 KPa).

While the methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A continuous process for the the partial oxidation of a high viscosity hydrocarbon feedstream comprising:

(1) passing a stream of water through the central conduit of a four-stream feed injector mounted in the upper portion of a gasifier, said feed injector comprising radially spaced concentric central, second, third, and outer cylindrical conduits, and said conduits being open at their downstream exit orifices for discharge;

(2) simultaneously passing a high viscosity hydrocarbon feedstream through the third cylindrical conduit;

(3) simultaneously passing a stream of free-oxygen containing gas, optionally in admixture with a temperature moderator, through the second and outer cylindrical conduits;

(4) mixing said streams from (1), (2) and (3) together prior to, at, or downstream from the outer conduit exit orifice; and (5) reacting the mixture from (4) in the reaction zone of the gasifier.

2. The process of claim 1 wherein the water is recycled gasification system water containing carbon soot from the gasifier.

3. The process of claim 2 wherein the velocity of the water in the feed injector is about 1.0–120 feet per second.

4. The process of claim 1 wherein the high viscosity hydrocarbon feedstock is selected from the group consisting of virgin crude, residua from petroleum distillation and cracking, petroleum distillate, reduced crude, whole crude, asphalt, coal tar, coal derived oil, shale oil, tar sand oil, solvent deasphalting bottoms, and mixtures thereof.

5. The process of claim 4 wherein the high viscosity hydrocarbon feedstock has a viscosity of about 600 centipoise or greater at a temperature of 480° F. (249° C.).

6. The process of claim 4 wherein the high viscosity hydrocarbon feedstock is fed to the gasifier at a temperature between about 550° F. (288° C.) and 600° F. (316° C.).

7. The process of claim 4 wherein the velocity of the high viscosity hydrocarbon feedstock in the feed injector is about 10 to 120 feet per second.

8. The process of claim 7 wherein the velocity of the high viscosity hydrocarbon feedstock is about 25–75 feet per second.

9. The process of claim 1 wherein the free-oxygen containing gas is selected from the group consisting of air, enriched air, and nearly pure oxygen.

10. The process of claim 9 wherein the temperature moderator is either steam, water or an inert gas.

11. The process of claim 9 wherein the velocity of the oxygen containing gas passing through the first and outer annular passages is in the range of about 50 feet per second to sonic velocity.

12. The process of claim 11 wherein the velocity of the oxygen containing gas passing through the first and outer annular passages is in the range of about 150–750 feet per second.

13. The process of claim 1 wherein the conditions in the reaction zone of the gasifier are at a temperature between about 1,700° F. (930° C.) and about 3,000° F. (1650° C.), and a pressure between about 1 atmosphere (100 KPa) and about 250 atmospheres (25,000 KPa).

14. The process of claim 13 wherein the temperature of the gasifier is between about 2,000° F. (1100° C.) and about 2,800° F. (1540° C.).

15. The process of claim 13 wherein the pressure of the gasifier is between about about 15 atmospheres (1500 Kpa) and about 150 atmospheres (1500 KPa).

* * * * *